US008626075B2

(12) United States Patent
Turk et al.

(10) Patent No.: US 8,626,075 B2
(45) Date of Patent: Jan. 7, 2014

(54) CHANGING PARAMETERS IN A TELECOMMUNICATIONS SYSTEM

(75) Inventors: John Turk, Newbury (GB); Paul Oxtoby, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 463 days.

(21) Appl. No.: 12/807,452

(22) Filed: Sep. 3, 2010

(65) Prior Publication Data
US 2011/0053587 A1    Mar. 3, 2011

(30) Foreign Application Priority Data

Sep. 3, 2009   (GB) .................................. 0915337.0

(51) Int. Cl.
H04B 17/00        (2006.01)
H04W 4/00         (2009.01)

(52) U.S. Cl.
USPC ........ 455/67.11; 455/423; 455/424; 455/425; 370/328; 370/331; 370/338

(58) Field of Classification Search
USPC ............... 455/68, 405, 446, 448, 450, 550.1, 455/67.11, 423–425; 370/235, 252, 328, 370/347, 331, 338
See application file for complete search history.

(56) References Cited

U.S. PATENT DOCUMENTS

| 6,519,452 | B1 * | 2/2003 | Agostino et al. ............... 455/423 |
| 6,859,486 | B1 * | 2/2005 | Mohebbi ........................ 375/132 |
| 8,145,186 | B1 * | 3/2012 | Vaughan ........................ 455/405 |
| 2003/0125952 | A1 * | 7/2003 | Engelke et al. ................ 704/260 |
| 2007/0002759 | A1 * | 1/2007 | Diaz et al. ..................... 370/252 |
| 2007/0147297 | A1 |  6/2007 | Diaz et al. |
| 2008/0170521 | A1 * | 7/2008 | Govindan et al. ............. 370/310 |
| 2010/0234032 | A1 * | 9/2010 | Chun et al. .................... 455/450 |
| 2012/0243412 | A1 * | 9/2012 | Voruganti et al. ............. 370/235 |

FOREIGN PATENT DOCUMENTS

WO    WO2006097839    9/2006

OTHER PUBLICATIONS

3GPP TS 23.236 V8.0.0 (Dec. 2008), 3rd Generation Partnership Project; Technical Specification Group Services and System Aspects; Intra-domain connection of Radio Access Network (RAN) nodes to multiple Core Network (CN) nodes (Release 8), 38 pp.
3GPP TS 25.331 V5.24.0 (Jun. 2009), 3rd Generation Partnership Project; Technical Specification Group Radio Access Network; Radio Resource Control (RRC); Protocol Specification (Release 5), pp. 1-100.

* cited by examiner

Primary Examiner — Inder Mehra
(74) Attorney, Agent, or Firm — Muirhead and Saturnelli, LLC

(57) ABSTRACT

A network includes a network core and a node that operates in accordance with a parameter value and is operable to record performance data during a repeating measurement period. The network includes OSS for instructing the node to change the parameter value. The node includes a processor which implements the change in parameter value always at the same predetermined point in the repeating measurement period, preferably at the beginning of the period. In this way, changes to the parameter value are synchronized with the repeating measurement period. It is therefore straightforward to determine how a change in the parameter value affects the performance data as the performance data gathered during a particular measurement period will have been collected while the parameter had a particular value. The processor may automatically change the parameter repeatedly between a first value and a second value during successive measurement periods.

22 Claims, 4 Drawing Sheets

CHANGING PARAMETERS IN A TELECOMMUNICATIONS SYSTEM

TECHNICAL FIELD

This application relates to a network including a network core, a node which operates in accordance with a parameter value and is operable to record performance data during a repeating measurement period, and a device for instructing the node to change the parameter value. This application also relates to a method of operating such a network.

BACKGROUND OF THE INVENTION

The performance of a network node (such as the base station of a mobile telecommunications network) is affected by external factors, such as environmental factors and the load on the node. When operating parameters of the node are adjustable, this allows the node to be optimized for use. It is known to adjust a parameter value of a node from a first value to a second value and to compare the performance of the node over periods when the different parameter values were applied. However, in known arrangements, which are described in more detail below, the exact time at which a parameter value is changed is not known, and this means that it is not possible to determine precisely whether changes in the recorded performance data are due to a change in the parameter value or due to some external factor. Further, known arrangements tend to apply a particular parameter value for an extended period of time, such as one week. This is unsatisfactory because an external factor that affects the node, such as a traffic jam, may be present during the week that the parameter was set to a first value but may be absent during the week that the parameter was set to the second value. This results in the performance data being misleading.

Accordingly, it would be desirable to provide a system for operating a network that addresses the above-noted issues.

SUMMARY OF THE INVENTION

According to the system described herein, there is provided a network including a network core, a node which operates in accordance with the parameter value and is operable to record performance data during a repeating measurement period, and an instruction device that instructs the node to change the parameter value, wherein the node includes a change implementing device that implements the change in parameter value at a predetermined point in the repeating measurement period.

In the embodiment to be described, the predetermined point in the repeating measurement period is the beginning of the period. As the node includes the change implementing device to implement the change in the parameter value at the beginning of the repeating measurement period, the parameter value that was applicable throughout any measurement period can be easily determined. It can therefore be identified that the recorded performance data during a particular period were obtained while the parameter had a particular value during that period. This provides a convenient way of evaluating the affect of the particular parameter value on the performance of the node.

The change implementing device of the node may comprise a processor which receives instructions via the network core. The processor may be operable to effect changes to the parameter value in synchronisation with the measurement period. The processor may be programmed to change the parameter value at different measurement periods automatically, so that the affect of the different parameter values can be determined by comparing the performance data for those measurement periods.

Advantageously, a particular first parameter value is applied to the node during several of the repeating measurement periods. Another parameter value may be applied to the node during other measurement periods which are interleaved with the measurement periods during which the first parameter value was applied. In this way, measurement periods that are adjacent in time have different parameter values.

During these adjacent-in-time measurement periods, the external factors affecting the node are likely to be the same or similar, and the recorded performance data during the respective measurement periods can be used to evaluate the performance of the node while the different parameter values are applied.

The network may include a plurality of nodes, and the change implementing device may change the parameter value of the parameter of nodes simultaneously.

In an embodiment, the network may be a cellular telecommunications network and the node may be a base station of that network. However, it should be appreciated that the system described herein is applicable to many types of network, and is not restricted to cellular telecommunications networks or wireless networks.

The network may include an analysis enabling device that enables analysis of the performance data measured during a first of the measurement periods in which the parameter has a first value and analysis of the performance data measured during a second of the measurement periods in which the parameter has a second value. The analysis enabling device may include a selection device that selects an optimum parameter value in dependence upon the analysis of the performance data. In this way, the network may be made self optimizing. That is, different parameter values may be applied, and their performance evaluated by comparing the performance data collected during different measurement periods. An algorithm may be provided for evaluating the performance data and for selecting the best parameter value for the node. This parameter value may then be automatically applied to the node to provide optimized performance. Performance data may be subsequently evaluated during further measurement periods and further optimisations performed if necessary.

According further to the system described herein, a method of operating a network is provided. The node is operated in accordance with a parameter value. Performance data relating to the node is recorded during a repeating measurement period. The node changes the parameter value. The node implements the change in parameter value at a predetermined point in the repeating measurement period. The method further includes automatically changing the parameter repeatedly between a first value and a second value at the predetermined point in the repeating measurement period. The network may be a cellular telecommunications network and the node is a base station of the cellular telecommunications network. The network may include a plurality of said nodes, and the parameter value of the plurality of said nodes may be changed simultaneously. The predetermined point in the repeating measurement period may be the beginning of the period. The method may further include analyzing the performance data measured during a first of the measurement periods in which the parameter has a first value and analyzing the performance data measured during a second of the measurement periods in which the parameter has a second value.

The method may further include selecting an optimal parameter value in dependence upon the analysis of the performance data.

According further to the system described herein, a computer readable medium may be provided storing computer software for operating a network in which the computer software includes executable code for performing features of the above-noted method.

BRIEF DESCRIPTION OF THE DRAWINGS

For a better understanding of the system described herein, embodiments will now be described with reference to the accompanying drawings in which.

In the drawings like elements are generally designated with the same reference sign.

DETAILED DESCRIPTION OF VARIOUS EMBODIMENTS

Figure 1:
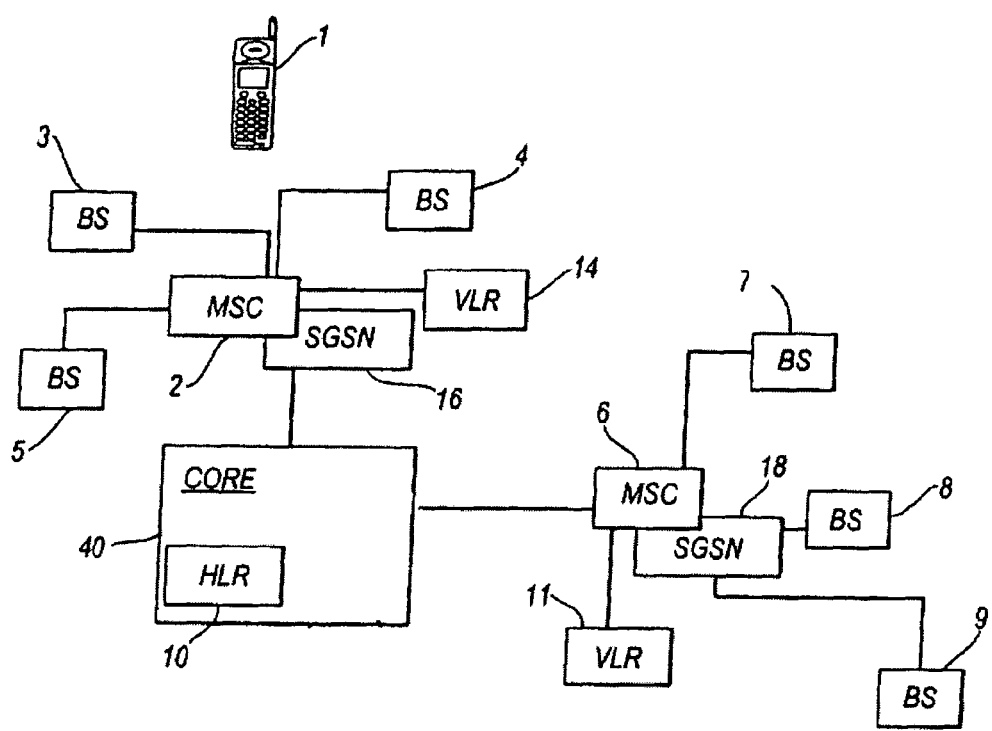
FIG. 1 is a diagrammatic drawing of elements of a mobile telecommunications network.

Certain elements of a mobile telecommunications network, and its operation, will now briefly be described with reference to FIG. 1.

Each base station (BS) corresponds to a cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are connected to a core network. Conventionally, in a GSM network the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated connection to their MSC 2 or MSC 6—typically a cable connection.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, which is incorporated herein by reference for features that may be appropriately applied to the system described herein, the base station follows prescribed rules to select which MSC to use, and then transmits this IMSI to the selected MSC.

MSC 2 now accesses the appropriate storage location in the HLR 10 present in the core network 40 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and a core network performing some of the functionality of the MSCs/VLRs. It is also to be appreciated that the functionality just described is one example of a network in which the embodiments of the system described herein may be implemented.

Figure 2:
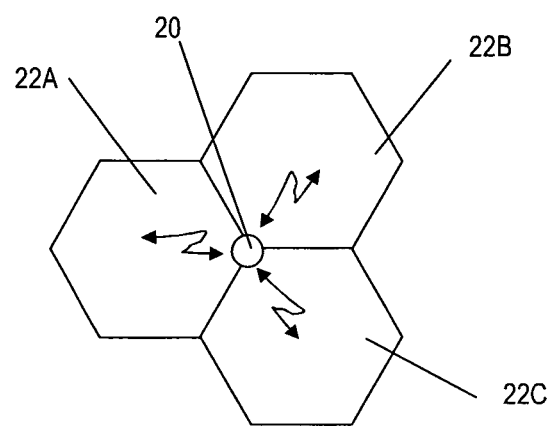
FIG. 2 is a diagrammatic drawing of a cell site and three cells served by that cell site.

Each base station is coupled to an antenna device. The base station and antenna device form a cell site 20 as shown in FIG. 2. The cell site 20 provides radio coverage to each of cells 22A, 22B and 22C. Each of cells 22A, 22B, 22C is referred to as a sector. The antenna device of the cell site 20 comprises three separate antenna elements, each of which is arranged to provide radio coverage to a respective one of the cells 22A, 22B and 22C.

Mobile networks such as 2G (GSM), 3G (UMTS) and LTE telecommunications networks have an active state of communication with their mobile terminals and an inactive/idle state of communication with their terminals. When in the active state, as the mobile terminals moves between different base stations of the network, the communication session is maintained by performing a "handover" operation between the base stations. In the inactive/idle state, as a mobile terminal moves between different base stations of the network the mobile terminal performs "reselection" to select the most appropriate base station on which to "camp" in order that the mobile terminal can be paged by the network when mobile terminating data is destined for that mobile terminal.

The mobile terminal or network may determine whether a handover/reselection procedure should be triggered in dependence upon measurements of the radio signals of the base stations in the region of the mobile terminal. One or more filters is applied to the signals (either by the network or by the mobile terminal or both) which calculates an average (e.g. arithmetical mean) value of these signals over a particular time period. These filtered/average values of the base stations are then compared with each other or with a threshold value. In dependence upon these comparisons, reselection/handover related procedures are triggered. This reselection/handover process generally comprises taking radio signal measurements of neighbouring base stations and comparing these to each other and to the radio signal of the current base station to determine which base station provides the best signal strength/quality. Handover/reselection to the best base station can then occur.

In a UMTS network, in the active state a network-driven handover is performed when necessary, as described in 3GPP TS 25.331, which is incorporated herein by reference for features that may be appropriately applied to the system described herein. In this state a mobile terminal scans the pilot channels of up to 32 intra-frequency base stations neighbouring its current base station. The mobile terminal forms a list of the best base stations for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. Although the algorithm that determines when handover occurs is not specified in the GSM or UMTS Standards, a typical algorithm triggers a handover when the mobile terminal provides a measurement of a neighbour base station received signal at the mobile terminal below which is better than the quality of the received signal from the serving base station by some margin.

If a mobile terminal has to change the base station with which it is registered an additional radio link to the new base station will be established. Up to six links can be in operation simultaneously by adding them to the active set of radio links. Dropping of links which do not significantly contribute to the overall link quality reduces the active set size and often eventually leads to a single link situation again (a single link to the best base station).

In order to add a radio link to the active set, the so-called reporting event has to be triggered. This is done if a triggering condition is fulfilled for the period Time to Trigger (TtT). During this time period the link measurement has to be within a certain reporting range complemented by a hysteresis. The Common Pilot Channel (CPICH) reception level may be chosen as the decision measure.

Radio link deletion from the active set is triggered if the decision measure is outside the reporting range with respect to a hysteresis for the TtT period.

If the maximum active set size is reached and a radio link that is not in the active set becomes better than the worst radio link in the active set for the TtT period, the worst radio link is replaced by the radio link that is currently not in the active set.

Various parameters of the base station 3 are adjustable. This allows, for example, the base station 3 to be optimized for use at a particular location. For example, the Time to Trigger value "TtT" may be varied for a particular base station 3 in order to optimise the likelihood of handover to the base station 3 by a mobile terminal 1, taking into account the radio conditions in the area of the base station 3 and the load profile of that base station.

Figure 3:
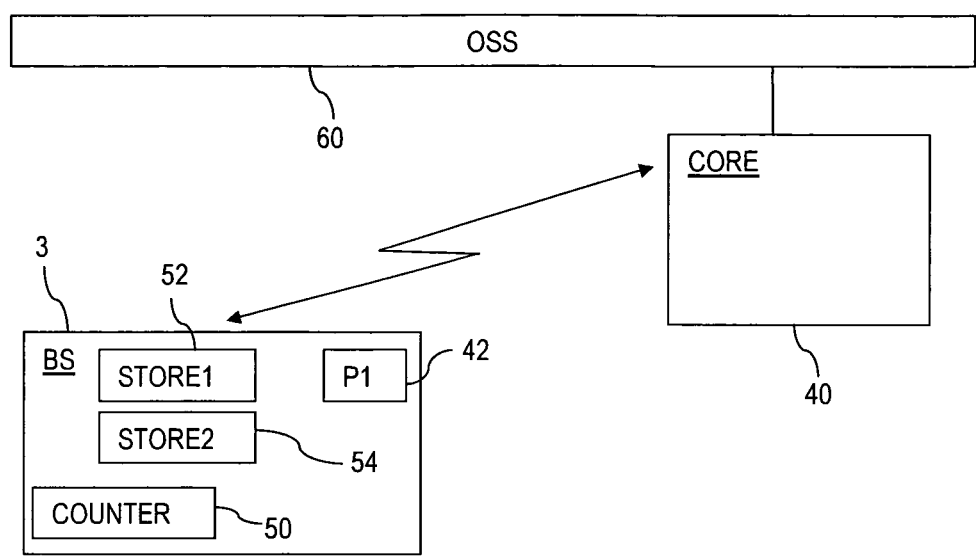
FIG. 3 is a diagrammatic drawing of a known arrangement of a network core and a base station in more detail.

Referring to FIG. 3, a parameter (e.g. TtT) of UMTS base station 3 is set to a particular value by module P1 42. Conventionally, this parameter is varied only very occasionally, and often only during the initial setting up of a base station.

If a network planner wishes to adjust a parameter of a base station a network planner will advise an OSS engineer of the change that the network planner wishes to make to a particular parameter of a particular base station. The OSS engineer will then issue a command to the relevant parameter adjustment module 42 of the base station. The exact time that the parameter will be adjusted by this process will not be known to the network planner.

The base station 3 also includes, in a conventional manner, a counter 50 which counts to a predetermined value and then is automatically reset. For example, the counter 50 is incremented each second until 15 minutes has passed, whereafter it is automatically reset.

The counter reset of all base stations in a network (or a group of the base stations) may occur simultaneously. For example, each of the base stations may include a highly accurate clock to facilitate synchronisation. The base station may be configured to perform the reset at regular time intervals, as indicated by the clock. In this way, the counter resets of the base stations may be synchronized.

The base station 3 records various data that are indicative of its performance. These data are stored by the base stations for periodic export via the network core 40. In this example each time a handover is attempted, this is stored in STORE1 52, and each time a handover failure occurs, this is stored in STORE2 54. When the counter 50 is reset, the counter 50 issues an instruction to STORE1 and STORE2 to export their values and reset their current contents. That is, the number of handover attempts stored in STORE1 will be zero after the reset and, similarly, the number of handover failures stored in STORE2 will also be zero after the reset. While the counter is subsequently incremented, each handover attempt and handover failure is then stored in the respective stores 52 and 54 until the counter 50 reaches its predetermined value. At this time, data relating to handover attempts and handover failures are exported from the respective stores 52,54 via the network core 40 to the OSS system 60. The network counter 50 is then reset, which automatically triggers clearing of the current contents of the stores 52,54.

The data exported via the network core 40 to the OSS system 60 may be analyzed to determine how the base station 3 is performing. If a network planner wishes to vary a parameter of the base station 3, which will typically be done to try to optimise the performance of the base station, the network planner can instruct an OSS engineer to effect a change to a parameter by issuing an instruction to the parameter adjustment module P1. As indicated above, conventionally, the exact time at which the change of the parameters is implemented by the module P1 will not be known to the OSS system 60.

If a network planner wishes to try to determine the affect of the change of a network parameter on the performance of a base station 3, they typically monitor base station performance data exported by the base station 3 over a period of one week while the parameter is set at a first value. The network planner will then instruct an OSS engineer to change the parameter to a different value, and will then analyse the exported base station performance data for the week following the change. The performance data may then be compared to determine which parameter values provided the optimum performance. The fact that the exact time that the parameter change is made does not significantly reduce the accuracy of the comparison as the performance data are compared over a week (and the period during which there is uncertainty over the parameter value is relatively insignificant).

Performance can be compared for the week before and the week after the change in parameter. However, it is often difficult to detect what affect a parameter change has made. There are many external factors which can make the base station performance data fluctuate, such as random changes in mobile device user locations and the number of calls, changes to aspects of the network made by others and equipment failures. These external factors often mask the effect of the parameter change. For example, during one week, there may be roadworks in the area served by the base station 3, which may not be present in the subsequent week. The presence of the roadworks will alter how the base station is used and will cause a significant difference in the number of handover attempts and handover failures. These changes to the number of handover attempts and handover failures would appear to the network planner, analyzing performance data from the respective weeks, to be the result of the change made to the parameter, whereas, in fact, the differences were due to the roadworks.

The embodiment now to be described seeks to provide an improved arrangement for changing the parameters of a base station and for more accurately determining the effect of parameter changes.

Figure 4:
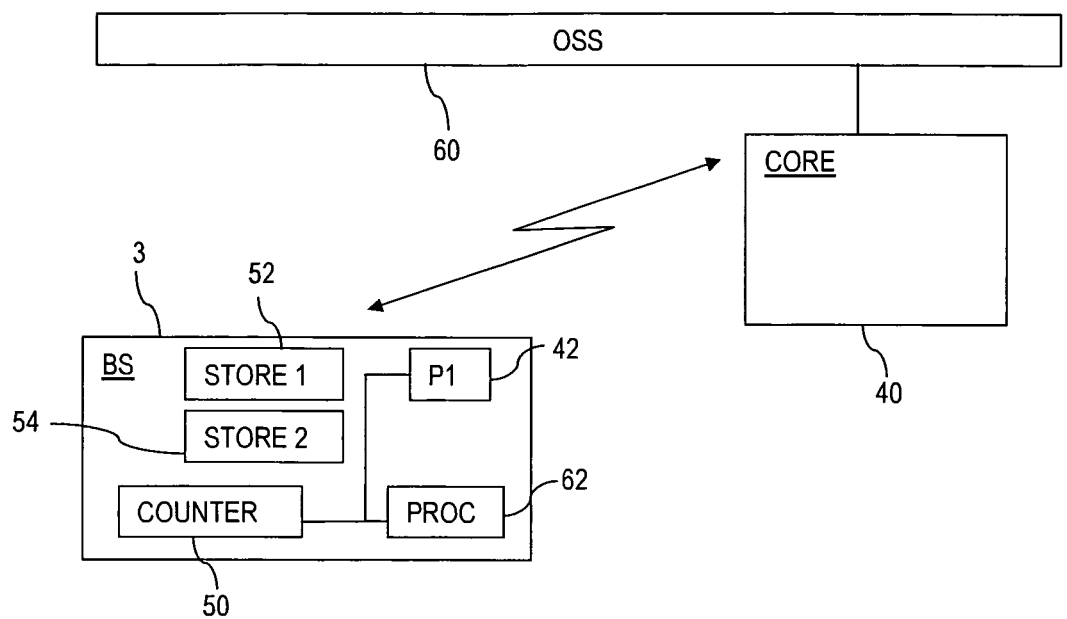
FIG. 4 is a diagrammatic drawing of a network core and a base station in accordance with the embodiment of the system described herein.

As shown in FIG. 4, an Operations Support System (OSS) 60 is used to manage the UMTS core network and provides a user interface that allows a network planner to view the current value of the parameters set by module P1 of the base station 3 (and other base stations in the network). The user interface also allows the network planner to instruct adjustment of a parameter by entering parameter change information. The network planner will input the new value of the parameter, and may input timing data which indicate during which times the new parameter value should be used. The network planner may indicate the number of counter periods over which the new parameter value should be applied.

When the network planner has finished entering the parameter change information into the OSS 60, the OSS 60 forwards this information to the UMTS base station 3 via the CORE network. The parameter change information is passed to processor 62 provided in the base station 3. The processor 62 stores the parameter change information. The processor 62 also monitors the current value of the counter 50 and the current time.

According to a feature of the embodiment, the processor 62 monitors for the occurrence of a reset of the counter 50 (which in this example occurs every 15 minutes, but of course could be any time period). When the counter 50 is reset the processor determines whether a change should be made to the parameter by comparing the current time with the timing data. If the timing data indicate that a change to the parameter should be made, the processor automatically instructs the changing of the relevant parameter by issuing a command to the parameter adjustment module P1 simultaneously with the occurrence of the counter reset. The change to the parameter value therefore occurs simultaneously with the resetting of the counter and therefore is synchronized with the counter period.

According to a feature of the embodiment, any subsequent change to the parameter value is also automatically performed simultaneously with a reset of the counter 50. The parameter may have a particular value for one counter period or a plurality of counter periods, as determined by the parameter change information. The period for which a particular parameter is used is advantageously a multiple of counter periods and synchronized with a reset of the counter period.

In the embodiment, as discussed above in relation to FIG. 3, performance data are stored in STORE1 and STORE2 during a counter period, the stores being cleared simultaneously with the counter reset. These performance data are exported when the counter 50 reaches its predetermined maximum value. The performance data may include an indication of the applied parameter value and the time during which the performance data were collected. The performance data may include information about other parameter values of the base station 3 and the times at which those parameter values were applied. Parameter changes may originate from sources other than the OSS 60. The performance data may also include details of other events such as hardware failures or link failures. The exported performance data may be transmitted to the OSS 60, where it can be evaluated by the network planner, or may be analyzed by an automated process. It is not essential that the performance data are exported when the counter 50 reaches its maximum value. The performance data may be stored elsewhere in basestation 3 and exported at another time or with a different frequency, provided that the time at which the changed parameter was applied is derivable.

Highly advantageously, according to the embodiment, the time period during which a parameter has a particular value corresponds to one or more complete counter periods. When the performance data are analyzed, it will then be known that all the performance data collected during a particular counter period were collected when the parameter had a particular value.

This should be contrasted with the prior art described in relation to FIG. 3, in which the exact time that a parameter change was implemented was not known. It was therefore likely that the counter period may include a portion where the parameter had an old value and a portion where the parameter had a new value, typically meaning that the performance data collected during that counter period could not be used to provide any meaningful indication of the effect of the change in parameter.

Advantageously, the user interface of the OSS 60 is used to program the processor 62 of the base station 3 to automatically switch a particular parameter value between a first value and a second value repeatedly. This switching between the first value and the second value could occur at every counter period, every other counter period or some other multiple of counter periods. This is advantageous because the performance data obtained when the different parameter values are applied are collected over relatively short successive time periods, during which the external factors are unlikely to change significantly. Considering the roadworks example given above, the embodiment described will allow the effect of the change in parameter to be determined over relatively short adjacent time periods. For example, if the roadworks were to last for one week, and a parameter was alternated between a first value and a second value at each reset of the counter 50 (i.e. every 15 minutes), a representative indication of the effect of each parameter would be given by the performance data, in contrast to the prior art. That is, the effect of both the parameter values during this load situation will be determined.

The network planner may arrange for the parameters of multiple base stations to be changed simultaneously. For example, a particular parameter of a group of base stations or group of cells may be changed simultaneously (when the counter 50 of each of the base stations resets).

Although embodiments are described herein in relation to a UMTS cellular telecommunications network, the system described herein is applicable to other types of network where it is desired to monitor the performance of nodes. The network may be a GSM or LTE cellular network, for example. The system described herein is not limited to cellular networks or wireless networks. The system described herein may be applied to any type of network in which the performance of nodes is affected by external factors/unpredictable events, such as environmental factors and the load on the node.

The parameter that is changed may be any parameter that affects the performance of the node.

The system described herein may advantageously be used to automatically test the effect of complicated sets of parameters. For example, three different parameters of the base station (or other node) may each be switched between four different values in order to determine the optimum combination of parameters. The different combinations of parameter values may be tested during successive counter periods under control of the processor 62, which is programmed to apply the different combinations to respective parameter adjustment modules by the network planner using the OSS 60.

The OSS 60 may be configured to monitor the performance data from a particular base station and may automatically detect if the performance of a base station falls below a threshold. When this is detected, the OSS 60 may be configured to instruct the processor 62 of that base station to adjust the parameters to default values that are known to provide a reasonable performance.

The OSS 60 and other nodes of the cellular network may also provide a self optimizing network (SON) feature. In this arrangement, the performance data are analyzed by the OSS 60 or other nodes. The performance data provided over different counter periods, during which the parameters have known values, are compared in order to automatically determine the optimum parameter values for the base station. The SON feature then transmits a command to the processor 62 of the base station to select the optimum parameter values.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A network, comprising:
 a network core;
 a counter configured to be reset after a given repeating time period;
 a node which operates in accordance with a parameter value and is operable to record performance data during a repeating measurement period; and
 an instructing device that sends an instruction to the node to change the parameter value,
 wherein the node is further configured to:
  receive the instruction to change the parameter value;
  implement the instruction at the node by changing the parameter value in synchronization with a reset of the counter; and
  record performance data relating to the changed parameter value during the repeating measurement period, wherein the performance data include an indication of a time at which the changed parameter value was applied.

2. The network of claim 1, wherein the change implementing device is operable to automatically change the parameter repeatedly between a first value and a second value at a predetermined point in the repeating measurement period.

3. The network of claim 2, wherein the predetermined point in the repeating measurement period is the beginning of the period.

4. The network of claim 1, wherein the network is a cellular telecommunications network and the node is a base station of the cellular telecommunications network.

5. The network of claim 1, wherein the network comprises a plurality of said nodes, and wherein the change implementing device changes the parameter value of the plurality of said nodes simultaneously.

6. The network of claim 1, further comprising:
 an analysis enabling device that enables analysis of the performance data measured during a first of the measurement periods in which the parameter has a first value and analysis of the performance data measured during a second of the measurement periods in which the parameter has a second value.

7. The network of claim 6, wherein the analysis enabling device includes a selecting device that selects an optimal parameter value in dependence upon the analysis of the performance data.

8. The network of claim 1, wherein the counter is configured to effect the change in the parameter value in synchronization with the counter by changing the parameter value simultaneously with the reset of the counter.

9. A method of operating a network, the network including a network core and a node, the method comprising:
 operating the node in accordance with a parameter value;
 operating a counter such that the counter is reset after given repeating time period;
 receiving an instruction to change the parameter value;
 implementing the instruction at the node by changing the parameter value in synchronization with a reset of the counter; and recording performance data relating to the node and the changed parameter value during a repeating measurement period, wherein the performance data includes an indication of a time at which the changed parameter value was applied.

10. The method of claim 9, wherein the repeating measurement period corresponds to a number of counter time periods, and wherein the method further comprises:
automatically changing the parameter repeatedly between a first value and a second value at the reset of the counter at an end of each repeating measurement period.

11. The method of claim 9, wherein the network is a cellular telecommunications network and the node is a base station of the cellular telecommunications network.

12. The method of claim 9, wherein the network comprises a plurality of said nodes, and wherein the parameter value of the plurality of said nodes is changed simultaneously.

13. The method of claim 9, wherein the change in the parameter value is effected in synchronization with the counter by changing the parameter value simultaneously with the reset of the counter.

14. The method of claim 9, further comprising:
analyzing the performance data measured during a first of the measurement periods in which the parameter has a first value and analyzing the performance data measured during a second of the measurement periods in which the parameter has a second value.

15. The method of claim 14, further comprising:
selecting an optimal parameter value in dependence upon the analysis of the performance data.

16. A non-transitory computer readable medium storing computer software for operating a network, the network including a network core and a node, the computer software comprising:
executable code that operates the node in accordance with a parameter value;
executable code that operates a counter such that the counter is reset after a given repeating time period;
executable code that receives an instruction to change the parameter value;
executable code that implements the instruction at the node by changing the parameter value in synchronization with a reset of the counter; and
executable code that records performance data relating to the node and the changed parameter value during a repeating measurement period, wherein the performance data includes an indication of a time at which the changed parameter value was applied.

17. The non-transitory computer readable medium of claim 16, wherein the repeating measurement period corresponds to a number of counter time periods, and wherein the computer software further comprises:
executable code that automatically changes the parameter repeatedly between a first value and a second value at the reset of the counter at an end of each repeating measurement period.

18. The non-transitory computer readable medium of claim 16, wherein the network is a cellular telecommunications network and the node is a base station of the cellular telecommunications network.

19. The non-transitory computer readable medium of claim 16, wherein the network comprises a plurality of said nodes, and wherein the parameter value of the plurality of said nodes is changed simultaneously.

20. The non-transitory computer readable medium of claim 16, wherein the change in the parameter value is effected in synchronization with the counter by changing the parameter value simultaneously with the reset of the counter.

21. The non-transitory computer readable medium of claim 16, wherein the computer software further comprises:
executable code that analyzes the performance data measured during a first of the measurement periods in which the parameter has a first value and analyzing the performance data measured during a second of the measurement periods in which the parameter has a second value.

22. The non-transitory computer readable medium of claim 21, wherein the computer software further comprises:
executable code that selects an optimal parameter value in dependence upon the analysis of the performance data.

* * * * *